US010153920B2

(12) United States Patent
Venkatachalam

(10) Patent No.: US 10,153,920 B2
(45) Date of Patent: Dec. 11, 2018

(54) INITIALIZING FEMTOCELLS

(75) Inventor: Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 1891 days.

(21) Appl. No.: 13/555,228

(22) Filed: Jul. 23, 2012

(65) Prior Publication Data

US 2012/0289222 A1 Nov. 15, 2012

Related U.S. Application Data

(63) Continuation of application No. 12/644,080, filed on Dec. 22, 2009, now Pat. No. 8,255,677.

(Continued)

(51) Int. Cl.
*H04L 12/66* (2006.01)
*H04L 12/04* (2006.01)
(Continued)

(52) U.S. Cl.
CPC .............. *H04L 12/66* (2013.01); *H04L 67/34* (2013.01); *H04W 12/04* (2013.01); *H04W 24/02* (2013.01); *H04W 52/10* (2013.01); *H04L 61/1511* (2013.01); *H04L 61/2015* (2013.01); *H04L 63/08* (2013.01); *H04W 12/06* (2013.01);
(Continued)

(58) Field of Classification Search
CPC . H04L 12/66; H04L 61/1511; H04L 61/2015; H04L 63/08; H04L 67/34; H04W 12/04; H04W 12/06; H04W 24/02; H04W 52/10; H04W 52/146; H04W 88/08; Y02D 70/124; Y02D 70/14; Y02D 70/122
See application file for complete search history.

(56) References Cited

U.S. PATENT DOCUMENTS 7,990,912 B2    8/2011  Nix et al.
2006/0173977 A1*  8/2006 Ho .................... H04L 67/125
                                                           709/220

(Continued)

FOREIGN PATENT DOCUMENTS

CN  101360094 A   2/2009
CN  101370306 A   2/2009
(Continued)

OTHER PUBLICATIONS

Newton Telecom Dictionary 22nd Edition, Harry Newton, 2006, CMP Books.*

(Continued)

*Primary Examiner* — Patrice L Winder
(74) *Attorney, Agent, or Firm* — Trop Pruner & Hu, P.C.

(57) ABSTRACT

A femtocell may be initialized on a network by automatically contacting a network service provider. The access point then automatically downloads an initial configuration from a bootstrap server belonging to the network service provider. In some cases, a femtocell access point may automatically determine, after boot up, whether it was pre-provisioned with credentials to authenticate itself with the network service provider. If so, it may use a domain name service to obtain an address of a bootstrap server. Otherwise, it may use dynamic host configuration protocol to discover the bootstrap server's Internet Protocol address.

12 Claims, 4 Drawing Sheets

Related U.S. Application Data

(60) Provisional application No. 61/223,360, filed on Jul. 6, 2009.

(51) Int. Cl.

| | | |
|---|---|---|
| *H04L 29/08* | (2006.01) | |
| *H04W 52/10* | (2009.01) | |
| *H04W 24/02* | (2009.01) | |
| *H04W 88/08* | (2009.01) | |
| *H04W 12/04* | (2009.01) | |
| *H04L 29/12* | (2006.01) | |
| *H04L 29/06* | (2006.01) | |
| *H04W 52/14* | (2009.01) | |
| *H04W 12/06* | (2009.01) | |

(52) U.S. Cl.
CPC .......... *H04W 52/146* (2013.01); *H04W 88/08* (2013.01); *Y02D 70/122* (2018.01); *Y02D 70/124* (2018.01); *Y02D 70/14* (2018.01)

(56) References Cited

U.S. PATENT DOCUMENTS

| | | | |
|---|---|---|---|
| 2007/0097939 A1 | 5/2007 | Nylander et al. | |
| 2007/0183427 A1 | 8/2007 | Nylander et al. | |
| 2008/0076419 A1 | 3/2008 | Khetawat et al. | |
| 2008/0076420 A1* | 3/2008 | Khetawat ............... | H04W 8/04 455/435.1 |
| 2008/0244148 A1 | 10/2008 | Nix et al. | |
| 2009/0092081 A1* | 4/2009 | Balasubramanian et al. ............... | 370/328 |
| 2009/0092096 A1 | 4/2009 | Czaja | |
| 2009/0129263 A1* | 5/2009 | Osborn ............... | H04W 76/022 370/230 |
| 2009/0131050 A1 | 5/2009 | Osborn | |
| 2009/0156213 A1* | 6/2009 | Spinelli ............... | H04W 76/022 455/436 |
| 2009/0233609 A1* | 9/2009 | Iun ............... | H04L 41/0806 455/445 |
| 2009/0265543 A1* | 10/2009 | Khetawat ............ | H04L 63/104 713/151 |
| 2010/0048221 A1* | 2/2010 | Yavuz ............... | H04L 25/03834 455/452.2 |
| 2010/0317338 A1* | 12/2010 | Ohsawa ................. | H04L 67/16 455/422.1 |
| 2011/0207461 A1* | 8/2011 | Lundqvist et al. ........... | 455/436 |
| 2011/0243097 A1* | 10/2011 | Lindqvist ............... | H04W 24/02 370/331 |
| 2012/0002594 A1* | 1/2012 | Racz .................. | H04L 63/0838 370/315 |
| 2012/0208504 A1* | 8/2012 | Song ..................... | H04W 12/06 455/411 |
| 2012/0289222 A1* | 11/2012 | Venkatachalam ....... | H04L 12/66 455/422.1 |
| 2012/0317224 A1* | 12/2012 | Caldwell ............. | H04L 41/0816 709/217 |

FOREIGN PATENT DOCUMENTS

| | | |
|---|---|---|
| WO | 2007/040449 | 4/2007 |
| WO | 2009018699 | 2/2009 |
| WO | 2009/029409 | 3/2009 |
| WO | 2009/048805 | 4/2009 |
| WO | 2011003004 | 1/2011 |

OTHER PUBLICATIONS

Korean Patent Office, International Search Report and Written Opinion issued in corresponding PCT Application No. PCT/US2010/040767, dated Feb. 28, 2011, 10 pgs.

First Chinese Office Action issued in corresponding CN patent application No. 201080040366.1, dated Jan. 24, 2013, [w/English translation] (18 pgs.).

Second Chinese Office Action issued in corresponding CN patent application No. 201080040366.1, dated Aug. 5, 2014, [w/English translation] (13 pgs.).

Third Chinese Office Action issued in corresponding CN patent application No. 201080040366.1, dated Dec. 9, 2014, [w/English translation] (8 pgs.).

First search report issued in corresponding CN patent application No. 201080040366.1, [w/English translation] (5 pgs.).

Supplemental search report issued in corresponding CN patent application No. 201080040366.1, [w/English translation] (4 pgs.).

3GPP2 TSG-X, FMOAHG, Airvana, "Femto Management Object Ad Hoc Group" , Jun. 16, 2009, (31 pgs).

IT Standard and Certification, Telecommunications Technology Association, No. 126, Nov.-Dec. 2009, [no English translation], (7 pgs.).

European Search Report in corresponding EP application No. 10797649.0 dated Jul. 12, 2016 (9 pages).

CN office action in corresponding CN application No. 201080040366.1 dated Jun. 10, 2015 (_ pages).

RU office action in corresponding RU application No. 2012103910 dated Aug. 22, 2014 (_ pages).

RU office action in corresponding RU application No. 2012103910 dated Apr. 11, 2014 (_ pages).

TW office action in corresponding TW application No. 099122026 dated Aug. 22, 2014 (_ pages).

CN office action in corresponding divisional CN application No. 201080040366.1 dated Aug. 1, 2018 (13 pages). (No translation of the Written Opinion.).

"Femto Management Object Ad Hoc Group Kickoff" Chair, FMOAHG Airvana, 3GPP2 TSG-X dated Jun. 16, 2009.

* cited by examiner

INITIALIZING FEMTOCELLS

CROSS REFERENCE TO RELATED APPLICATIONS

This continuation application claims priority to U.S. patent application Ser. No. 12/644,080 filed Dec. 22, 2009, issued as U.S. Pat. No. 8,255,677 on Aug. 28, 2012, and provisional application 61/223,360, filed Jul. 6, 2009, which provisional application is hereby expressly incorporated by reference herein.

BACKGROUND

This relates generally to wireless networks and, particularly, to the use of wireless networks that include femtocells, sometimes called access point base stations or home base stations.

A femtocell is a cell that is generally low powered and has relative small range, often connected to a service provider's network via a broadband connection, such as digital subscriber line (DSL) or cable. It can be provisioned by the user of a mobile station on an operator's network. One benefit of a femtocell is to extend wireless service coverage indoors.

While they may be initialized by a consumer, femto access points generally cannot be initiated into an operator's network, such as a WiMAX network.

DETAILED DESCRIPTION

In accordance with some embodiments, a femtocell may be initialized on a wireless operator's network, such as a WiMAX (IEEE Std. 802.16-2004, IEEE Standard for Local and Metropolitan Area Networks, Part 16: Interface for Fixed Broadband Wireless Access Systems, IEEE New York, N.Y. 10016) or a WiFi (IEEE Std. 802.11 (1999-07-015) Wireless LAN Medium Access Control (MAC) and Physical Layer Specifications) network. This enables mobile stations to operate within the femtocell so that the femtocell access point is recognized by a wireless service provider.

The femtocell may be pre-provisioned with certain credentials so that a femtocell access point can authenticate itself to the operator's network and become attached to that network. The pre-provisioned parameters may include non-operator specific parameters such as the specific credentials for a particular wireless protocol, such as a WiMAX protocol. It may also include operator specific credentials including the fully qualified domain name (FQDN) of a bootstrap server in the femtocell network service provider (NSP).

The access point discovers a bootstrap server to download the initial configuration and start the attached process to the operator's network. If the FQDN of bootstrap server is pre-provisioned, then the bootstrap server's address can be discovered easily via domain name system (DNS) lookup. However, if the FQDN of the bootstrap server is not pre-provisioned, then the bootstrap server's Internet Protocol (IP) address can be discovered through dynamic host configuration protocol (DHCP) options.

Figure 1:
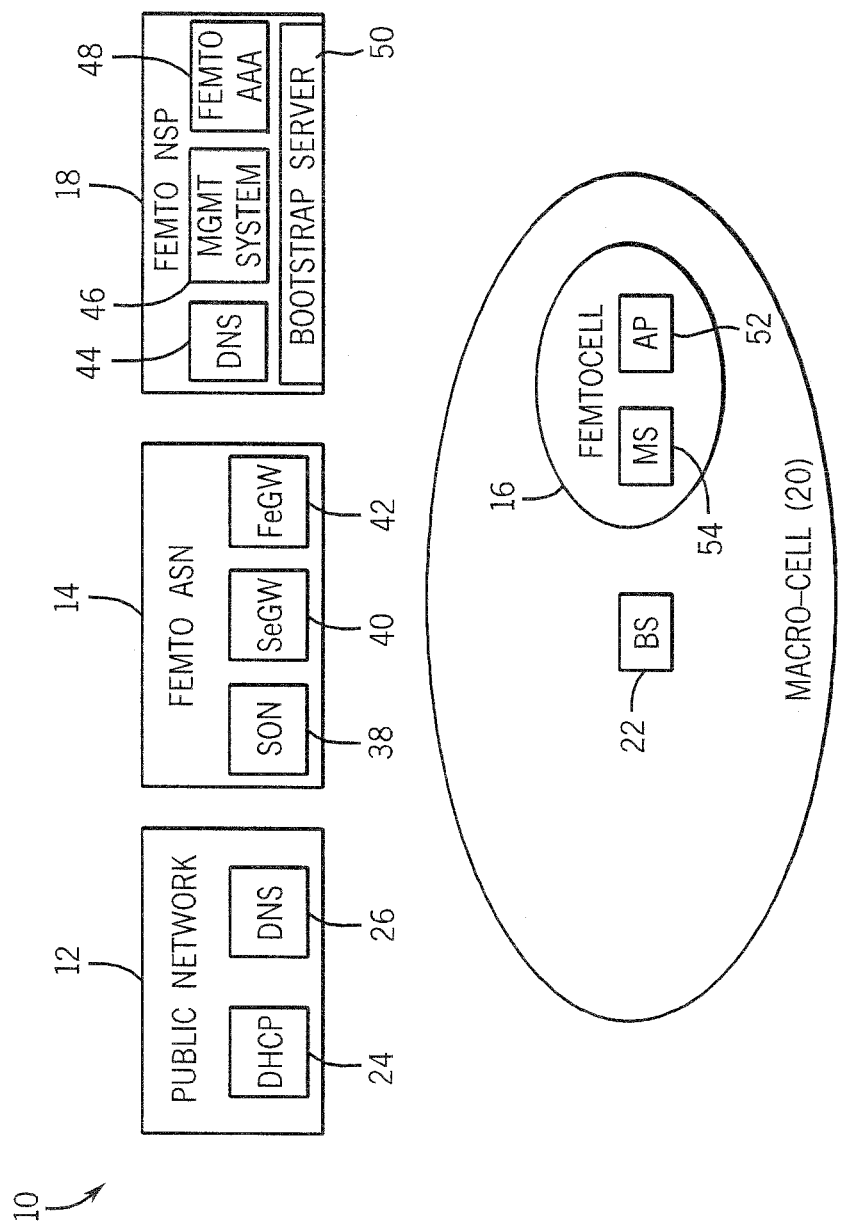
FIG. 1 is a system depiction for one embodiment.

Referring to FIG. 1, the wireless system 10, in accordance with one embodiment, may include a public network 12, including a DHCP server 24 and a DNS server 26. A femto access service network (ASN) 14 may include a Self Organization Network (SON) server 28, a security gateway (SeGW) 40, and a femtocell or home gateway (FeGW) 42. The femto NSP 18 may include a DNS server 44, a management system or server 46, and a femto authentication authorization and accounting (AAA) server 48, as well as a bootstrap server 50. The bootstrap server initializes the femtocell on the operator's network.

The femtocell 16 may include an access point 52, as well as one or more mobile stations 54. The femtocell 16 may be part of a macro-cell 20, including a base station 22. In one embodiment, the macro-cell is part of a WiMAX network.

Figure 2:
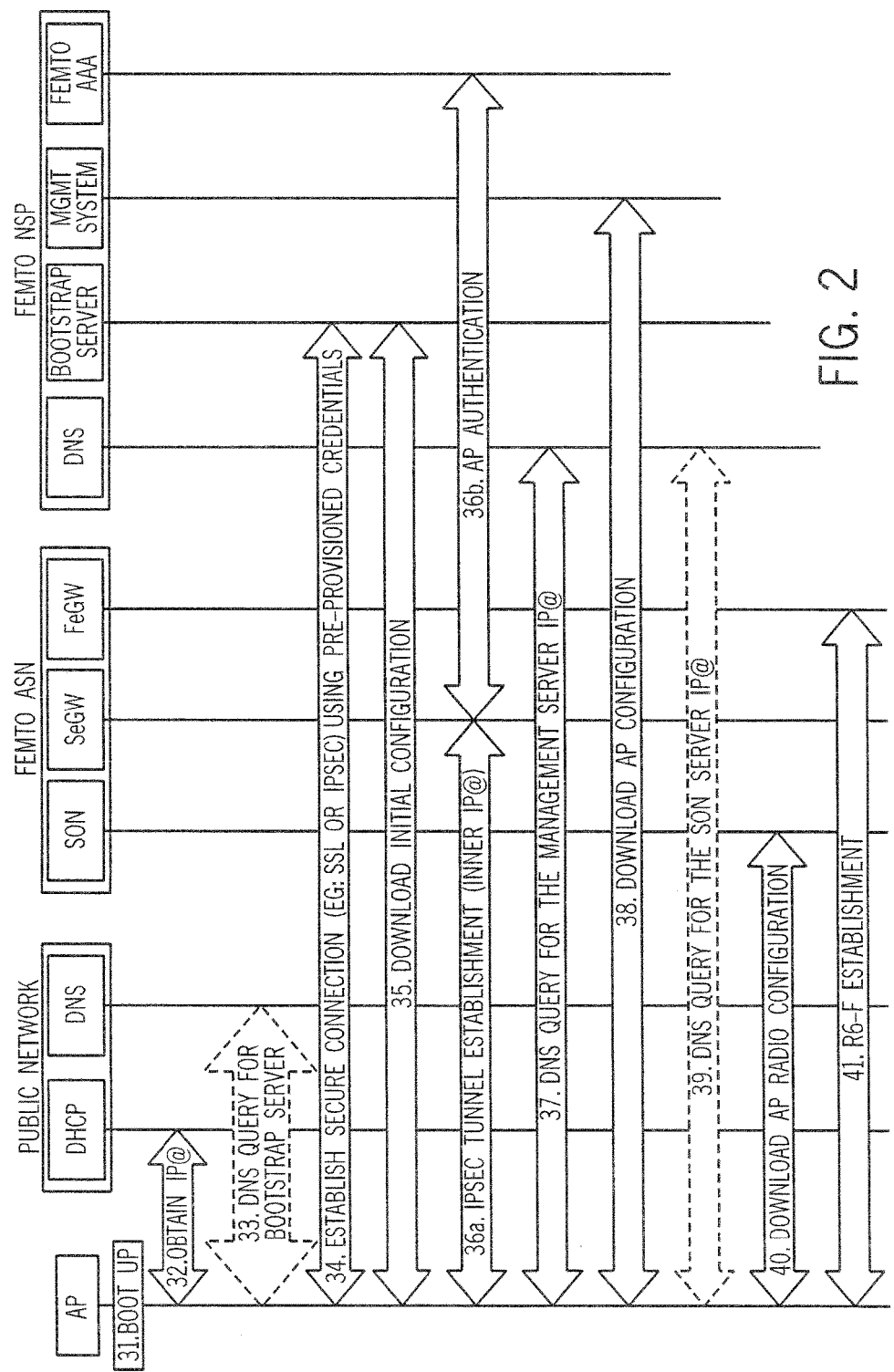
FIG. 2 is a depiction of the sequence of operations in initializing a femtocell in accordance with one embodiment.

Referring to FIG. 2, at 31, the access point boots up. At 32, the access point obtains the outer Internet Protocol address from the public backhaul network, such as a DSL or cable network, via DHCP. If the access point does not have a pre-provisioned FQDN of a bootstrap server, the Internet Protocol address of the bootstrap server may be provided as a DHCP option.

Then, at 33, in an alternate embodiment, the access point is pre-provisioned with the FQDN of the bootstrap server 50. The access point may do a DNS query for the IP address of the bootstrap server in the femto NSP. At 34, once the IP address of the bootstrap server is determined by the access point in steps 32 or 33, the access point may establishe a secure connection with the bootstrap server. This secure connection may be bootstrapped using pre-provisioned credentials in one embodiment.

In 35, the access point connects to the bootstrap server and requests initial configuration information. The access point sends its location information, for example, global positioning systems (GPS) information or a zip code that was registered during the access point signup with the time to NSP, for the SeGW 40 selection. The access point downloads the address of the SeGW from the bootstrap server 50. The access point also obtains the FQDN of the management system 46.

In 36, the access point may establish an Internet Protocol security (IPsec) tunnel with the SeGW and at 36b, access point authentication is performed in one embodiment. The SeGW relays extensible authentication protocol (EAP) messages to the femto AAA server for authentication of the access point. The inner Internet Protocol address is also assigned to the access point by the default SeGw.

At 37, the access point does a DNS query to obtain the Internet Protocol address of the management server from the FQDN obtained at 35. The access point connects to the management system at 38. The access point sends its local information to the management system, including the Internet Protocol address of the access point, hardware serial number, software version, location number, and the like. Based on the information provided by the access point, the management system 46 provides the higher layer configuration parameters to the access point. Along with these parameters, either the FQDN or IP address of the SON server may be returned to the access point in one embodiment.

If the FQDN of the SON server is obtained at 38, then a DNS query is executed at 39 to obtain the Internet Protocol address of the SON server. This step may not be executed if the IP address of the SON server is directly returned in step 38.

At 40, the access point connects to the SON server and the access point sends its local information to the SON server, including the macro-cell/femtocell radio environment information. This information may include frequency and preamble information, as examples. The location of the access point is authorized by the SON server. Based on the information provided by the access point, the SON server provides the physical and medium access control (MAC) layer configuration parameters to the access point and authorizes the access point to turn on the radio transmission.

At 41, the access point establishes an R6-F data path with the femto gateway 42.

Figure 3:
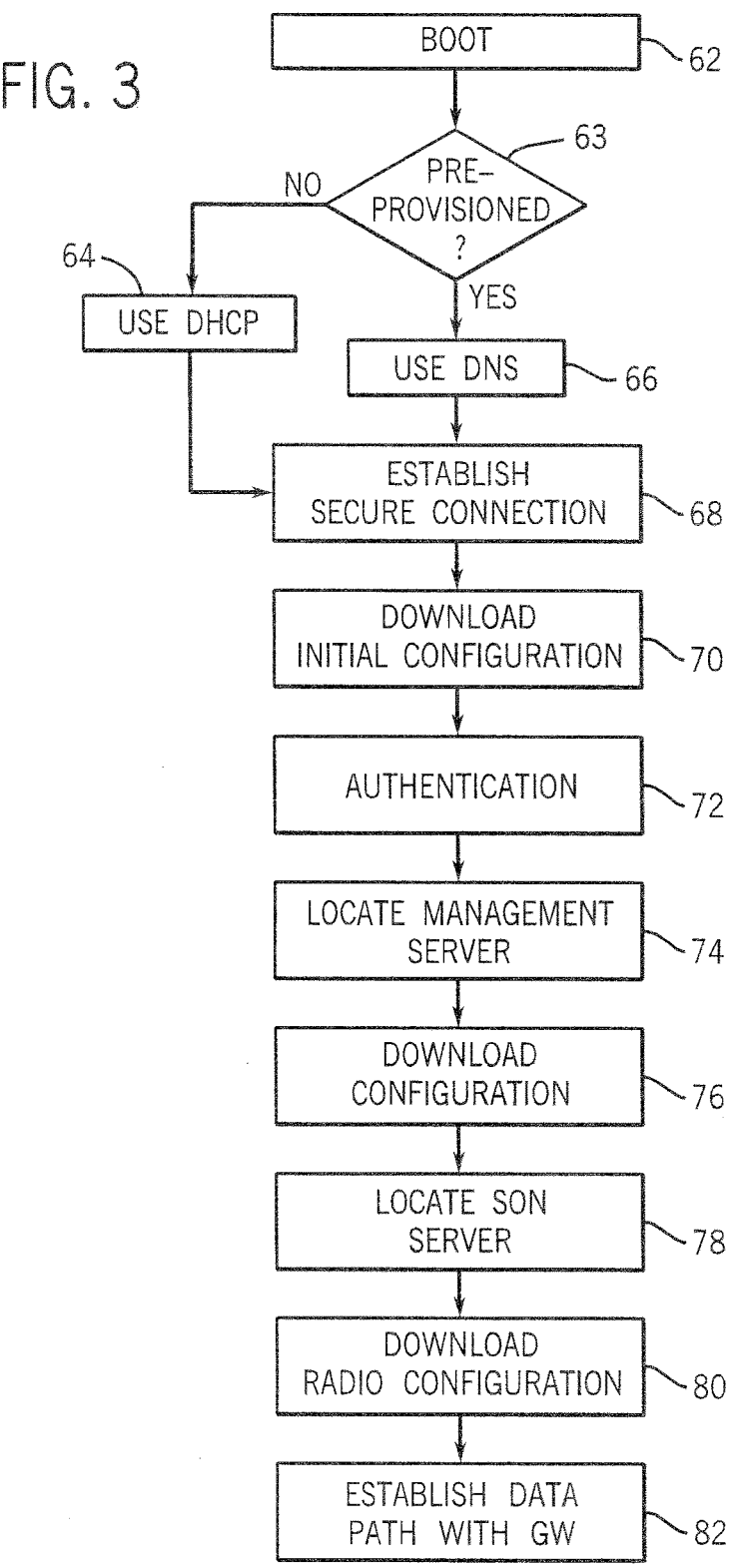
FIG. 3 is a flow chart for one embodiment.

Turning to FIG. 3, the sequence depicted there can be implemented in software, hardware, or firmware in the access point 52. In the software implemented embodiment, the software may be implemented by a sequence of instructions executed by a processor or controller. The instructions may be stored on a computer readable medium, such as an optical, magnetic, or semiconductor memory.

Initially, the femtocell access point boots up, as indicated in block 62. Then, at diamond 63, the access point determines if it was pre-provisioned with credentials. If so, it obtains an Internet Protocol address in block 66 using DNS. Otherwise, it uses DHCP to locate the bootstrap server in block 64. After establishing a secure connection with a bootstrap server in block 68, an initial configuration is downloaded in block 70. This may be followed by authentication with SeGW in block 72.

Next, a management system or server 46 is located, as indicated in block 74. Another configuration is downloaded in block 76.

In block 78, an SON server is located and a radio configuration is downloaded in block 80. Finally, the data path with a femto gateway is established in block 82.

Figure 4:
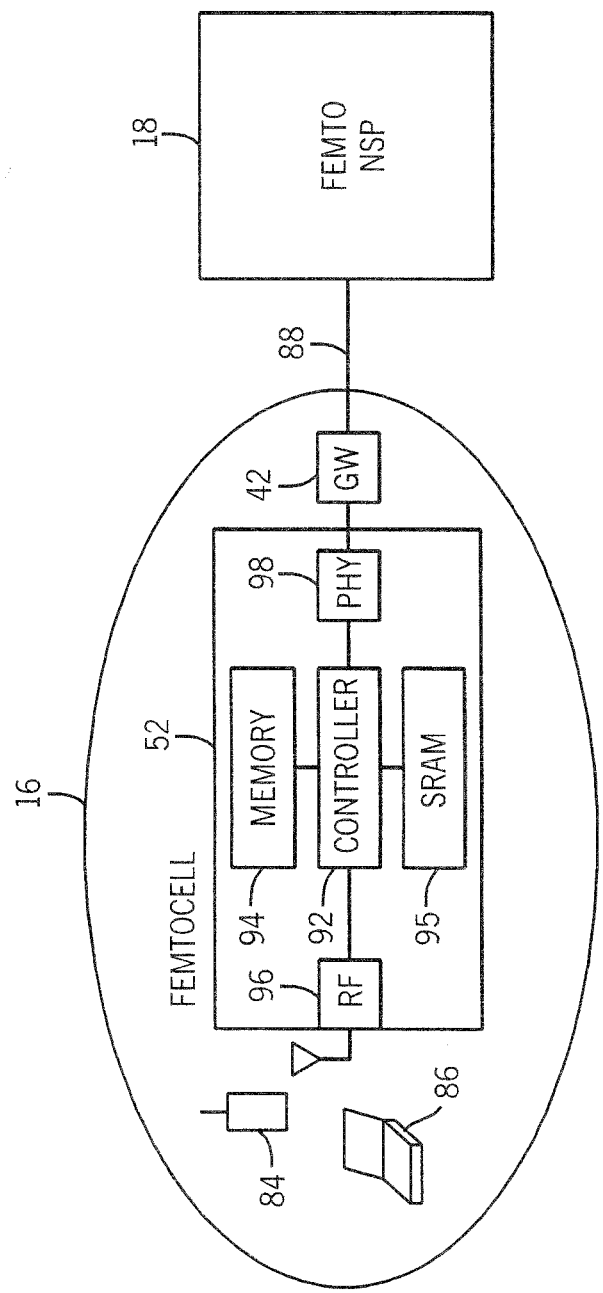
FIG. 4 is a schematic depiction of a femtocell for one embodiment.

Referring to FIG. 4, a femtocell 16 may be established within a user's home. It may communicate with various items in the femtocell, such as a cell phone 84 or a laptop computer 86 using a short range wireless protocol. It may also communicate with a home or femto gateway 42, adapted to operate with a DSL or cable connection 88. The connection 88 connects the femtocell 16 to a femto network service provider 18.

The femtocell access point 52 may include a controller 92 coupled to a non-volatile memory 94, such as a flash memory. A volatile memory 95 may be a static random access memory (SRAM) in one embodiment. A radio frequency transceiver 96 may provide wireless signals for proximate devices. An Ethernet physical layer 98 connects the controller 92 to the femto gateway 42.

In a software implemented embodiment, the memory 94 may store instructions executed by the controller 92. However, other storage/controller combinations may also be used.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
    automatically initiating by an femtocell access point that is part of a macro-cell, upon boot-up, a secure connection with a security gateway;
    establishing a secure connection with a network service provider and downloading an initial configuration from the network service provider;
    receiving over a wireless protocol a fully qualified domain name (FQDN) of a management system;
    initiating a query of a domain name server, using the fully qualified domain name, to obtain an internet protocol address of a management system;
    receiving, from the domain name server, the internet protocol address of the management system to establish the secure connection with the management system;
    downloading a second configuration from the management system; and
    locating a self organization network (SON) server and downloading a radio configuration from the SON server.

2. The method of claim 1 including automatically determining, after boot up, whether the femtocell access point is pre-provisioned with credentials to authenticate itself with a network service provider.

3. The method of claim 1 including pre-provisioning the femtocell access point with credentials for a particular wireless protocol.

4. The method of claim 1 including pre-provisioning the femtocell access point with a domain name of the management system in a femtocell network service provider.

5. The method of claim 1 including automatically sending the location of the femtocell access point to a network service provider.

6. The method of claim 1 including enabling the femtocell access point to automatically register with a network service provider.

7. One or more non-transitory computer readable media storing instructions to perform a sequence comprising:
    automatically initiating by an femtocell access point that is part of a macro-cell, upon boot-up, a secure connection with a security gateway;
    establishing a secure connection with a network service provider and downloading an initial configuration from the network service provider
    receiving over a wireless protocol a fully qualified domain name (FQDN) of a management system;
    initiating a query of a domain name server, using the fully qualified domain name, to obtain an internet protocol address of a management system;
    receiving, from the domain name server, the internet protocol address of the management system to establish the secure connection with the management system;
    downloading a second configuration from the management system; and
    locating a self organization network (SON) server and downloading a radio configuration from the SON server.

8. The media of claim 7, further storing instructions to perform a sequence including automatically determining, after boot up, whether the femtocell access point is pre-provisioned with credentials to authenticate itself with a network service provider.

9. The media of claim 7, further storing instructions to perform a sequence including pre-provisioning the femtocell access point with credentials for a particular wireless protocol.

10. The media of claim 7, further storing instructions to perform a sequence including pre-provisioning the femtocell access point with a domain name of the management system in a femtocell network service provider.

11. The media of claim 8, further storing instructions to perform a sequence including automatically sending the location of the femtocell access point to a network service provider.

12. The media of claim 8, further storing instructions to perform a sequence including enabling the femtocell access point to automatically register with a network service provider.

\* \* \* \* \*